May 18, 1965 A. SEARS 3,184,627
ARMATURES FOR ELECTRICAL GENERATORS, MOTORS, AND THE LIKE
Filed Oct. 10, 1960 2 Sheets-Sheet 1

INVENTOR
ANTHONY SEARS
BY
*Jerome Bauer*
ATTORNEY.

May 18, 1965  A. SEARS  3,184,627
ARMATURES FOR ELECTRICAL GENERATORS, MOTORS, AND THE LIKE
Filed Oct. 10, 1960  2 Sheets-Sheet 2
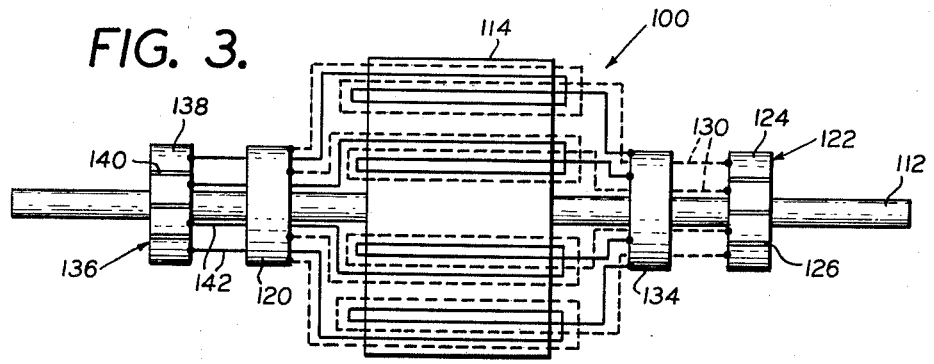
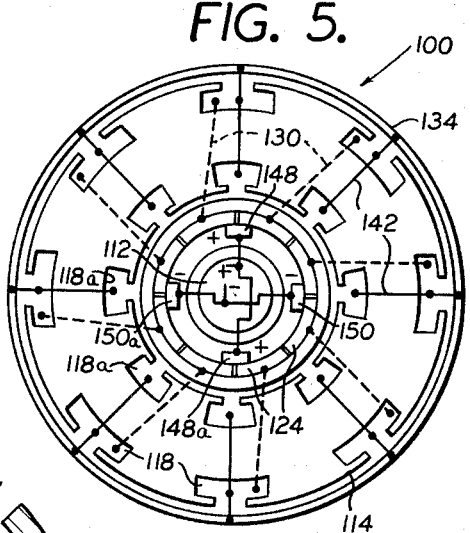
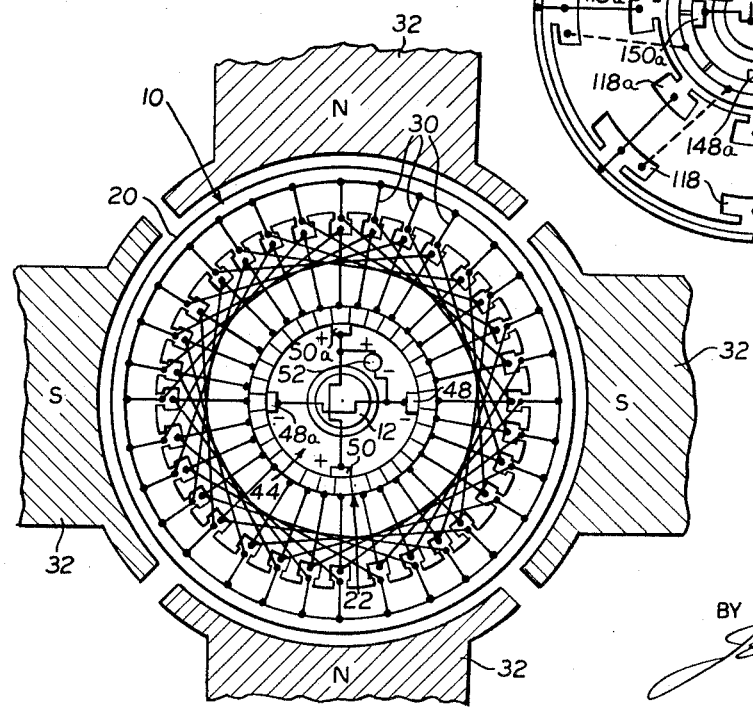
INVENTOR
ANTHONY SEARS
BY
*Jerome Bauer*
ATTORNEY.

United States Patent Office 3,184,627
Patented May 18, 1965

3,184,627
ARMATURES FOR ELECTRICAL GENERATORS, MOTORS, AND THE LIKE
Anthony Sears, 88—00 Shore Front Parkway, New York, N.Y.
Filed Oct. 10, 1960, Ser. No. 61,539
2 Claims. (Cl. 310—137)

This invention relates to armatures embodying certain of the principles of construction and operation of copending application Serial No. 29,729, filed May 17, 1960, for improvements in "Direct Current Generators," and, more particularly, to electric armatures for use in such equipment as generators, motors, and the like.

The desideratum of this invention is to provide an armature which, when used in a generator, will enable the production of a higher current output than available from presently known generator armatures in which the current output is normally a fraction of the number of coil windings or inductors employed therein.

It is accepted that each time a coil or inductor cuts or interrupts magnetic lines of force of a magnetic field a voltage is induced in the coil. In generators having series wound armatures, the current output is generally less than the number of coil windings or inductors. It is an object of this invention to provide an armature for use in a direct current generator to enable the production of a higher current output than that available in normal series wound armatures.

It is another object of this invention to proved an armature in which the coil windings thereof are connected in parallel relationship; one in which the armature is capable of producing direct current when employed in a generator, and one in which the inductors or coil windings are arranged at a point thereof in a homopolar relationship.

Still another object of the invention is to provide an armature which, when employed in an electrical generator, will produce direct current that is steady, non-pulsating and uniform in pressure.

A further object of the invention is the provision of an armature which, when employed in an electrical generator, will enable the generation of greater amounts of current than prior known generators of comparable size, that because of its simplicity it will enable the construction of smaller and less expensive generators than heretofore available, and because of its novel details of construction it will enable the removal of two or more sets of voltages of different values from the generator in which the same may be employed.

Figure 1:
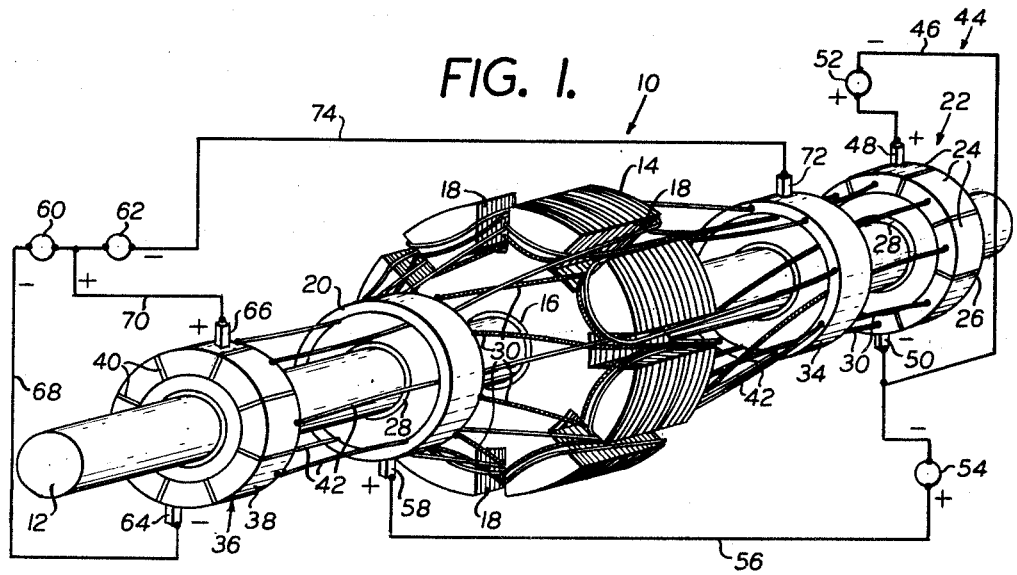
Figure 2:
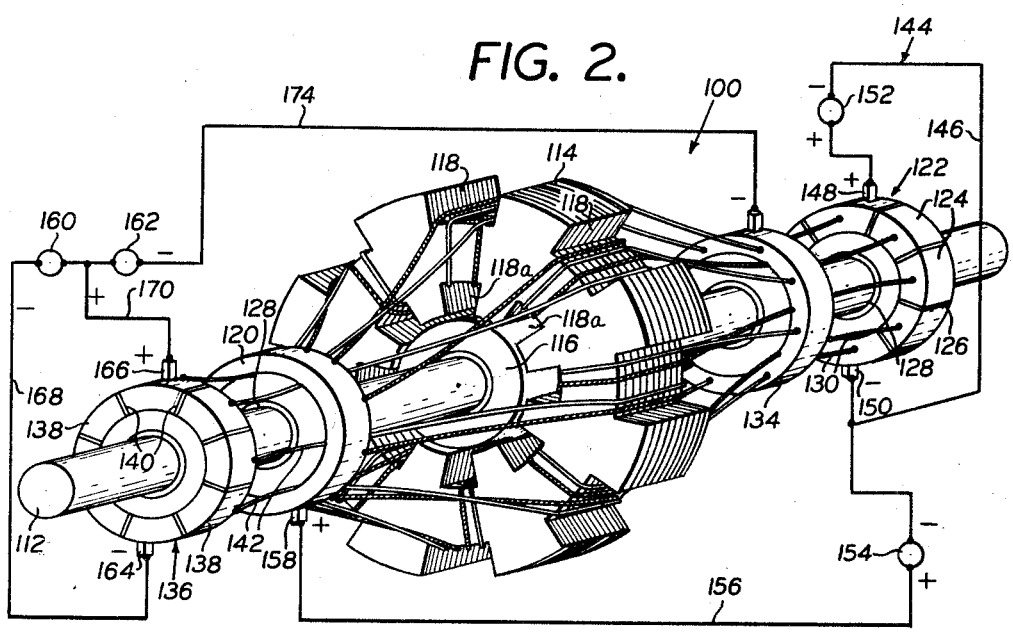

Other and further objects of my invention reside in the structures and arrangements hereinafter more fully described with reference to the accompanying drawings in which:

FIG. 1 is a perspective view of a drum wound rotor constructed in accordance with the teaching of the invention, FIG. 2 is a perspective view of a ring wound rotor constructed in accordance with the teaching of the invention, FIG. 3 is a diagrammatic side view of FIG. 2, FIG. 4 is a diagrammatic end view of a modification of FIG. 1 and with the armature positioned between a plurality of pole pieces, and FIG. 5 is a diagrammatic end view of a modification of FIG. 2.

Referring now to the drawings and more particularly to FIG. 1 thereof, there is shown an electrical armature structure generally identified by the numeral 10. The armature 10 comprises a shaft 12 that is rotatable by any suitable exterior source. Mounted on the shaft 12 is a rotor or core 14 consisting of a plurality of soft iron laminations. The core 14 is secured for rotation with the shaft 12 at an insulator 16 that is interposed therebetween and is provided with a plurality of axially directed slots 18 defined in the periphery of the core, each slot being circumferentially spaced from the other about the periphery of the core.

The armature structure 10 is provided with a set of electrically conductive inductor elements comprising a plurality of wires drum wound about the periphery of the core 14. The wires serve as inductors to cut or interrupt magnetic lines of force when the armature is employed as a part of a generator device or to carry current when employed as part of a motor. In the showing of FIG. 1, there are two sets of conductive inductor elements each comprising a plurality of wires. Hence, it may be said that the core 14 is wound two-in-hand.

Included in the armature structure 10 is at least one electrically conductive structure (not numbered) comprising an endless unbroken electrically conductive ring-shaped member 20, an endless unbroken member generally identified by the numeral 22 having a plurality of electrically conductive segments 24, each circumferentially spaced from the other in insulated relationship by insulating spacers 26, and one of the two sets of inductor wire elements. The ring-shaped member 20 and its respective unbroken ring-shaped member 22 both are insulated from the shaft 12 but connected thereto for conjoint rotation therewith and with the core member 14 at 28. The endless unbroken conductive member 20 and its segmented member 22 are each electrically connected with the other by the plurality of electrically conductive inductor elements of one of the two sets of the wires 30. The wires 30 are portrayed in braided form solely for purposes of illustration and, therefore, their illustration in the drawing should not be deemed limiting of the invention.

The plurality of wires 30 of the one set of electrically conductive elements each have one of their ends electrically connected to a respective one of the insulated segments 24 and the other of their ends electrically connected with the endless unbroken conductive member 20. Thus, each of the wires 30 complete the electrically conductive structure comprising the endless unbroken member 20 and the broken or segmented member 22. Because each one of the elements 30 is electrically connected at its one end with the unbroken conductive member 20, each wire of the same set may be said to be in electrical communication with every other wire of the set. Hence, the member 20 serves to connect the one of the ends of one set of electrically conductive elements 30 in homopolar parallel relationship while each one of the wires 30 of such set is also electrically connected at its other end with a respective one of the segments 24 of the endless broken member 22.

As illustrated in FIG. 1 of the drawing, the unbroken conductive member 20 and the interrupted or broken conductive member 22 are positioned along the axial extent of the shaft 12 and spaced from each other to be located on opposite sides of the core 14. However, those skilled in the art will readily understand that this arrangement constitutes no limitation on the scope of the invention since it is entirely feasible and practical to locate both the unbroken member 20 and corresponding segmented member 22 on the same side of the core 14.

In the illustration of FIG. 1 the electrically conductive elements 30 are drum wound about the core 14 having portions thereof passing through and seated in the slots 18 thereof. The illustration in FIG. 1 shows the conductive elements 30 wound in immediately adjacent spaced slots of the core 14. However, the specific slots 18 in which the turns of windings of such wires are positioned and the relative spacing therebetween may be varied depending upon the result desired. Accordingly, FIG. 4 discloses the turns of the winding elements 30 extending through and being seated in a plurality of slots 18 each having a greater relative spacing than that shown in FIG. 1. The armature structure 10 shown in FIG. 4 is adapted to be utilized in an electrical motor and, therefore, the relative spacing between the slots in which the turns of the conductive elements 30 are wound is greater than that shown in FIG. 1 wherein, the armature 10 thereshown is adapted to be employed in an electrical generator.

In practice it has been found that when the armature 10 is employed in a motor structure (FIG. 4) having a plurality of spaced pole pieces 32, the turns of the electrically inductive elements 30 should not be in slots 18 whose relative spacing is greater than the medial distance from one of the pole pieces 32 to the next adjacent pole piece. Thus, in the motor structure having four pole pieces 32 as shown in FIG. 4, the relative spacing of the slots 18 in which the turns of the conductive wire element is wound shall be no greater than 90° of arc, the same being the medial distance betwen the two adjacent pole pieces.

In the illustration of the armature structure 10 of FIG. 1, there is disclosed a second electrically conductive structure comprising an endless unbroken ring-shaped member 34 including an endless broken or segmented ring-shaped member 36 having a plurality of segments 38 each insulated from the other by non-conductive insulators 40. The endless members 34 and 36 of the second electrically conductive structure have the same elemental details as previously described with respect to the members 20 and 22, and are joined in circuit by a set of electrically conductive inductor elements in the form of the plurality of wires 42.

The set of electrically conductive wire elements 42 form a part of the second conductive structure and link together the member 34 at one of their ends with a respective one of the segments 38 at the other of their ends. Thus, each one of the wires 42 of their set is connected together with every other wire 42 of the set at the unbroken conductive member 34 in homopolar parallel relationship while the intermediate portions thereof are wound in predeterminately spaced ones of the slots 18 defined in the periphery of the core 14 in the manner and for the purpose previously described. However, in no event shall the turns of any one of the wire elements 40 be positioned in slots, the relative spacing of which is greater than the medial distance from one pole piece to the next adjacent pole piece when the armature 10 is utilized in a motor structure such as is shown in FIG. 4.

When the armature 10 shown in FIG. 1 is employed in a generator, during rotation of the shaft 12 the turns of each one of the wires of the two sets of inductor wire elements 30 and 42 individually interrupt and cut magnetic lines of force set up by the magnetic fields of the pole pieces (not shown) of the generator structure. Accordingly, an electromotive force is induced in each turn of each one of the inductors which, being electrically connected with its respective unbroken conductive member 20 or 34, transmits the same thereto.

Thus, a current induced in any one of the turns in any of the sets of inductor elements 30 or 42 is transmitted to its unbroken conductive member 20 or 34 respectively. Because each one of the wires of each set 30 or 42 has one of its ends electrically engaged in parallel relationship with every other wire element of its same set at its respective unbroken ring-shaped member 20 or 34, a current induced in any one wire of a set is transmitted to the unbroken member 20 or 34 and able to be removed therefrom by any other wire of the same set at the respective segmented ring-shaped member 22 or 36, as the case may be.

Hence, it will be understood that in the present construction, as each turn of each inductor wire of each set 30 or 42 interrupts or cuts lines of magnetic force, an electromotive force is induced therein and a current may be taken therefrom or from any other wire of the same set connected therewith in homopolar parallel relationship, at its respective unbroken conductive member 20 or 34. In consequence, the parallel arrangement and relationship of the inductor elements of each set 30 or 42 permits a multiplication of the current output rather than a division thereof as is obtainable in presently constructed direct current generators. Moreover, the homopolar connected relationship of each one of the inductors of any set enables the production of a steady, non-pulsating current, that is uniform in pressure and which may be removed from the armature in the form of direct current at the segmented members 22 and 36.

To accomplish the removal of direct current, there is provided a first electrical circuit generally identified by the numeral 44. The first electrical circuit comprises a conductor 46 having an electrical contact means 48 in the form of a brush at one end thereof and a second electrical contact 50 in the form of a brush at the other end thereof. The contacts 48 and 50 are in engagement with the conductive segments 24 of the rotating member 22 and thus facilitate the completion of a circuit with a load 52.

The present invention is capable of supplying at least two separate voltages to different loads, however, those skilled in the art will readily recognize that each set of electrically conductive structures comprising an unbroken ring member and a segmented ring member connected by a respective set of conductive elements may be capable of supplying current to three different loads if desired. Thus, in the present invention the brush contact 50 may also serve as a negative side of a second electrical circuit having a load 54. Connector 56 serves to complete the positive side of the second electrical circuit to the load 54 at the electrical brush contact 58 that is taped to the periphery of the unbroken conductive member 20. Quite obviously, the value of the voltage applied to the load 54 will be one-half that applied to the load 52.

In the event it is desired to utilize the armature 10 in a generator to provide a voltage to a third load (not shown), the brush contact 48 may serve as one terminal of the circuit thereof while an additional brush contact of opposite polarity may be taped to the unbroken ring-shaped member 20 at a position thereof opposite to that of the brush contact 58. In this way, a third load will have imparted to it a voltage equal to one-half the value of that supplied to the load 52 of circuit 44 and may be likened to the connection of the load 54 of the second electrical circuit.

Inasmuch as there is more than one electrically conductive structure included in the armature 10 of FIG. 1; namely, that comprising the unbroken conductive member 34, the segmented member 36 and the set of connecting conductive elements 42, it is possible once again to complete circuits to at least one or more loads 60 and 62. Thus, a first electrical circuit may be completed to the load 60 by means of the brush contacts 64 and 66 engaging the segments of the rotating member 36 and being connected with the load 60 by way of the conductors 68 and 70. Similarly, a second circuit may be completed to the load 62 at the positive side thereof by utilizing the contact 66 and the conductor 70 and at the negative side thereof by taping the unbroken ring member 34 at the brush contact 72 and connecting the same at 74 to the negative side of the load 62.

Inasmuch as only two brush contacts 48 and 50 or 64 and 66 are described, the armature structure 10 illustrated in FIG. 1 may be utilized in a generator of bipolar construction. If more than two poles are provided in the generator in which the instant armature is to be employed, the number of brush contacts of the first electrical circuits engaging each one of the electrically conductive structures at their respective segmented members 22 and 36 will be increased in number equal to the number of pole pieces of the generator. Thus, in FIG. 4 where the illustration contains four pole pieces 32, the first electrical circuit 44 thereof includes four electrical brush contacts 48, 48a, 50 and 50a.

The embodiment 100 of the electrical armature structure illustrated in FIGS. 2, 3 and 5 does not differ materially from that disclosed with respect to armature 10 previously described. Therefore, in order to avoid repetitious descriptions of like details, structural elements of the armature 100 having the same details corresponding to those of the previously described armature structure 10 will be identified by like numerals in the one hundred (100) series wherein, the last two digits of such one hundred series will correspond to the same elements of the structure of embodiment 10.

The armature 100 is exactly the same in operation and structural details as the aforementioned embodiment 10 differing therefrom solely in the construction of the core or rotor 114. The embodiment 100 is a ring-wound armature distinguishing from the drum-wound armature 10 illustrated in FIG. 1. For this reason, therefore, the core 114, being composed of laminations of soft iron, is hollow and secured for rotation with the shaft 112 at the insulator 116.

Because the core 114 is ring-wound, it is provided with a plurality of sets of radially aligned exterior and interior slots 118 and 118a. The slots 118 and 118a are circumferentially spaced about the external and internal surfaces respectively of the core. Accordingly, each wire of each set of electrically conductive inductor elements or wires 130 and 142 is wound around the core 114 in a two-in-hand relationship and spaced in a respective set of radially aligned slots 118 and 118a. The relationship of winding of each one of the wire elements of the two sets is perhaps more clearly illustrated in the diagrammatic view of FIG. 3. As thereshown, each one of the wires of their respective sets 130 and 142 is connected at its opposite ends with its respective unbroken member and a respective segment of its broken conductive member in the same manner as was described in the embodiment 10.

Each one of the wires 130, being ring-wound intermediate its ends in a respective pair of radially aligned slots 118 and 118a of the core 114, is connected at its one end with the unbroken conductive member 120 and at its other end with its respective segment 124 of the broken member 122. Thus, the wires 130 are arranged in homopolar parallel relationship at the unbroken member 120. The wires 142, being ring-wound about radially aligned pairs of slots 118 and 118a of the core 114, are connected at one of their ends with the unbroken member 134 in homopolar parallel relationship and at the other of their ends with a respective one of the segments 138.

A first electrical circuit 144 may be completed to a load 152 by way of the brush contacts 148 and 150 connected therewith at 146. A second electrical circuit including the load 154 may be completed by way of the brush contact 150, and a connector 156 taped to the unbroken member 120 at the contact 158. The operation of the first and second circuits of the instant embodiment 100 is the same manner as that described with respect to embodiment 10. Similarly, the first and second electrical circuits, leading to the loads 160 and 162, function in the same manner as the loads 60 and 62 of the armature 10.

Once again, if the armature 100 is to be utilized in a generator structure (not shown) having more than two pole pieces, the number of brush contacts 148, 150 or 164, 166 will be increased to equal the number of pole pieces utilized in the generator construction. For illustrative purposes only, therefore, FIG. 5 discloses four brush contacts 148 and 148a and 150 and 150a to indicate the placement and relationship of the same in the event the number thereof must be increased to accommodate a greater number of pole pieces provided in the generator construction in which the armature 100 may be employed.

It is to be noted that the armature structures of embodiments 10 and 100 have been disclosed for use in connection with electrical generators and motors; however, the same are not intended to be so limited, it being entirely reasonable to expect that the same may be employed in other similar electrical systems wherever feasible. In the present invention, the parallel homopolar relationship of each set of electrically conductive inductor elements makes it possible to obtain a multiplication of voltage output simply by increasing the number of windings of each inductor element about the core thereby increasing the number of inductors that will interrupt or cut magnetic lines of force when the armature of either embodiment is employed as part of a generator structure. It must also be recognized by those who are skilled in the art that the current output may, in like manner, be varied to increase or decrease the same by utilizing electrically conductive inductor elements or wires of lesser or greater thickness as the case may be.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. In an armature for an electrical generator or the like, a shaft, a core rotatable with said shaft, first and second electrically conductive structures each rotatable with said shaft and each including an endless unbroken electrically conductive member and an endless broken member having a plurality of circumferentially spaced electrically conductive segments and a first set of a plurality of electrically conductive wires wound about predetermined portions of said core, said plurality of wires of said first set being connected in parallel at one of their ends with the unbroken member of said first structure and at the other of their ends with a respective segment of said broken member of said first structure, a second set of a plurality of electrically conductive wires, said plurality of wires of said second set being connected in parallel at their opposite ends with the unbroken member and a respective segment of said broken member of said second structure, and electrical circuits for each of said first and second conductive structures respectively including contact means completing a circuit through said unbroken and broken members thereof, said core having a plurality of slots circumferentially spaced about the periphery thereof, and said wires being drum wound on said core in predetermined ones of said slots.

2. In an armature for an electrical generator or the like, a shaft, a core rotatable with said shaft, first and second electrically conductive structures each rotatable with said shaft and each including an endless unbroken electrically conductive member and an endless broken member having a plurality of circumferentially spaced electrically conductive segments and a first set of a plurality of electrically conductive wires wound about predetermined portions of said core, said plurality of wires of said first set being connected in parallel at one of their ends with the unbroken member of said first structure and at the other of their ends with a respective segment of said broken member of said first structure, a second set of a plurality of electrically conductive wires, said plurality of wires of said second set being connected in parallel at their opposite ends with the unbroken member and a respective segment of said broken member of said second structure, and electrical circuits for each of said first and second conductive structures respectively including contact means completing a circuit through said unbroken and broken members thereof, said core being hollow and having a plurality of sets of radially aligned slots circumferentially spaced about the external and internal surfaces thereof, and said wires being ring wound in predetermined ones of said sets of radially aligned slots.

References Cited by the Examiner

UNITED STATES PATENTS

| | | | |
|---|---|---|---|
| 517,105 | 3/94 | Henderson | 310—137 |
| 1,361,546 | 12/20 | Politowski | 318—305 |
| 1,576,615 | 3/26 | Paulero. | |
| 2,021,000 | 11/35 | Dietze | 310—177 X |
| 2,747,116 | 5/56 | Poole | 310—128 |

FOREIGN PATENTS

| | | |
|---|---|---|
| 817,934 | 10/51 | Germany. |
| 933,041 | 9/55 | Germany. |
| 132,607 | 9/19 | Great Britain. |
| 523,377 | 4/35 | Italy. |

MILTON O. HIRSHFIELD, *Primary Examiner.*